United States Patent [19]
DeJule et al.

[11] Patent Number: 5,594,565
[45] Date of Patent: Jan. 14, 1997

[54] PROGRAMMABLE LIQUID CRYSTAL WAVEFRONT DEVICE

[75] Inventors: Michael C. DeJule; Nabeel A. Riza, both of Clifton Park, N.Y.

[73] Assignee: General Electric Company, Schenectady, N.Y.

[21] Appl. No.: 348,403

[22] Filed: Dec. 2, 1994

[51] Int. Cl.⁶ ............................................. G02F 1/13
[52] U.S. Cl. ........................... 349/19; 345/98; 345/100; 349/31
[58] Field of Search .................... 345/98, 100; 359/54, 359/55, 57, 58

[56] References Cited

U.S. PATENT DOCUMENTS

| | | | |
|---|---|---|---|
| Re. 33,921 | 5/1992 | McLaughlin et al. | 359/85 |
| 3,753,609 | 8/1973 | Leibowitz | 350/160 |
| 3,776,615 | 12/1973 | Tsukamoto et al. | 350/160 |
| 3,835,463 | 9/1974 | Tsukamoto et al. | 340/324 |
| 4,884,875 | 12/1989 | Okumura | 359/55 |
| 4,964,701 | 10/1990 | Dorschner et al. | 350/336 |
| 5,168,382 | 12/1992 | Tsujikawa | 359/56 |
| 5,319,492 | 6/1994 | Dorn et al. | 359/296 |

OTHER PUBLICATIONS

A page from Rodenstock RM 600 Laser Stylus catalog.
N. A. Riza et al., "Novel Programmable Nematic Liquid Crystal Lens Devices," Detector Technologies Lab, May 1994.
N. A. Riza et al., "Three–Terminal Adaptive Nematic Liquid–Crystal Lens Device," Optical Society of America, 1994, pp. 1013–1015.
T. Tatebayashi et al., "Electro–Optic Variable Focal–Length Lens Using PLZT Ceramic," Applied Optics, vol. 30, No. 34, Dec. 1, 1991, pp. 5049–5055.

Primary Examiner—Mark R. Powell
Assistant Examiner—Vincent E. Kovalick
Attorney, Agent, or Firm—Donald S. Ingraham

[57] ABSTRACT

A programmable liquid crystal optical wavefront device selectively exhibits characteristics either as a lens or as a beam deflector; the device includes a liquid crystal (LC) control apparatus that is disposed in an LC cell to selectively deflect light beams passing through the LC cell. The LC control apparatus includes a bias electrode network and a bias control circuit electrically coupled to the bias electrode network to provide the appropriate bias voltages across the bias electrodes to determine the operation of the device in the lens mode and in the beam deflector mode. The bias control circuit includes a lens bias resistor circuit, a beam deflector bias resistor circuit, each of which comprise a plurality of respective resistor stages, and a lens/beam deflector switch circuit that selectively couples the resistor circuits to the bias electrode network to cause the device to operate in the lens mode or in the beam deflector mode. The lens/beam deflector switch circuit includes a plurality of thin film switches that are typically disposed on the same substrate with the bias resistors of the two resistor bias circuits.

27 Claims, 3 Drawing Sheets

PROGRAMMABLE LIQUID CRYSTAL WAVEFRONT DEVICE

RELATED APPLICATIONS AND PATENTS

This application is related to the application entitled "Three Terminal Liquid Crystal Lens Cell", Ser. No. 08/348,404, file Dec. 2, 1994 filed contemporaneously herewith and incorporated herein by reference.

BACKGROUND OF THE INVENTION

Electro-optic devices such as liquid crystal cells are used in optical signal processing to control the passage of light beams through the processor. Optical signal processing is used in laser communication systems, optical recording and reading systems, and optical computing and associated interconnection architecture. Elements commonly used in optical processing systems include lenses for deflecting light along converging paths to a focal point and beam deflectors for deflecting beams along parallel paths.

Liquid crystal (LC) cells can be used in optical processors as beam deflectors or lenses. Although electro-optic devices such as LC cells typically have many desirable characteristics, such as rapid and variable responses, to date electro-optic liquid crystal devices providing such advantages have proved to be rather cumbersome, requiring a large number of LC pixels (e.g., 100 or more independently controlled pixels in a device having a pixel pitch of about 100 µm) with an associated grid of control electronics. Each independently controlled pixel requires an associated driver to generate signals to control the pixel in coordination with other pixels to provide the desired optical wavefront effect.

It is an object of this invention to provide a high quality electro-optic wavefront device that provides both lens and beam deflector capabilities, and is compact, robust, readily fabricated, does not require extensive control electronics, and that efficiently deflects the light passing therethrough.

SUMMARY OF THE INVENTION

In accordance with this invention programmable liquid crystal optical wavefront device adapted to selectively exhibit characteristics either as a lens or as a beam deflector includes a liquid crystal (LC) control apparatus that is disposed in an LC cell to selectively deflect light beams passing through the LC cell. The LC control apparatus includes a bias electrode network and a bias control circuit electrically coupled to the bias electrode network to provide the appropriate bias voltages across the bias electrodes to operate the device in the lens mode and in the beam deflector mode.

The bias control circuit includes a lens bias resistor circuit, a beam deflector bias resistor circuit, each of which comprise a plurality of respective resistor stages, and a lens/beam deflector switch circuit that selectively couples the resistor circuits to the bias electrode network to cause the device to operate in the lens mode or in the beam deflector mode. The bias electrodes are electrically coupled together in series, with a respective resistor circuit stage coupled between each sequentially-coupled pair of bias electrodes. In the beam deflector mode, the resistor networks are coupled to the bias electrode network such that a substantially uniform voltage drop occurs between bias electrodes that are sequentially coupled together; in the lens mode, the resistor networks are coupled to the bias electrode network such that a center-biased symmetrical quadratic voltage pattern is generated across the bias electrode network. Typically, one bias resistor circuit, such as the beam deflector bias resistor circuit, is coupled to the bias resistor network at all times, and the lens/beam deflector switch circuit coupled the respective stages of the other resistor bias circuit (in this case, the lens bias resistor circuit) with the beam deflector bias resistor circuit for lens mode operation of the device. The resistance values of the resistor stages of the lens bias circuit are chosen to provide the desired symmetrical quadratic voltage profile when coupled in parallel with the beam deflector resistor bias circuit.

The lens/beam deflector switch circuit includes a plurality of thin film switches (such as thin film transistors) that are typically disposed on the same substrate with the thin film resistors of the two resistor bias circuits to provide a compact and rugged optical wavefront device having both beam deflector and lens modes.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1A:
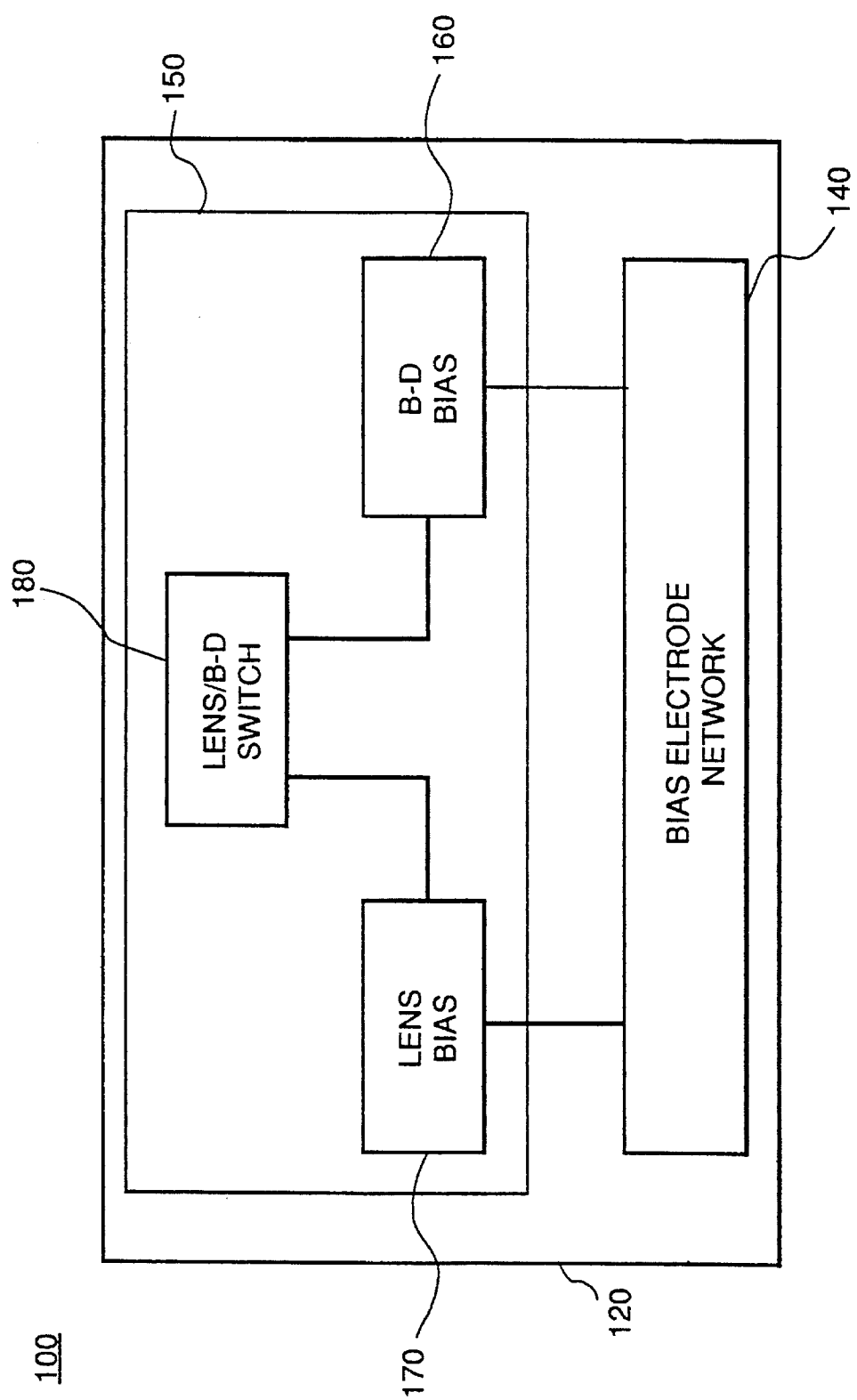
FIG. 1(A) is a block diagram of a programmable liquid crystal optical wavefront device in accordance with the present invention.
Figure 1B:
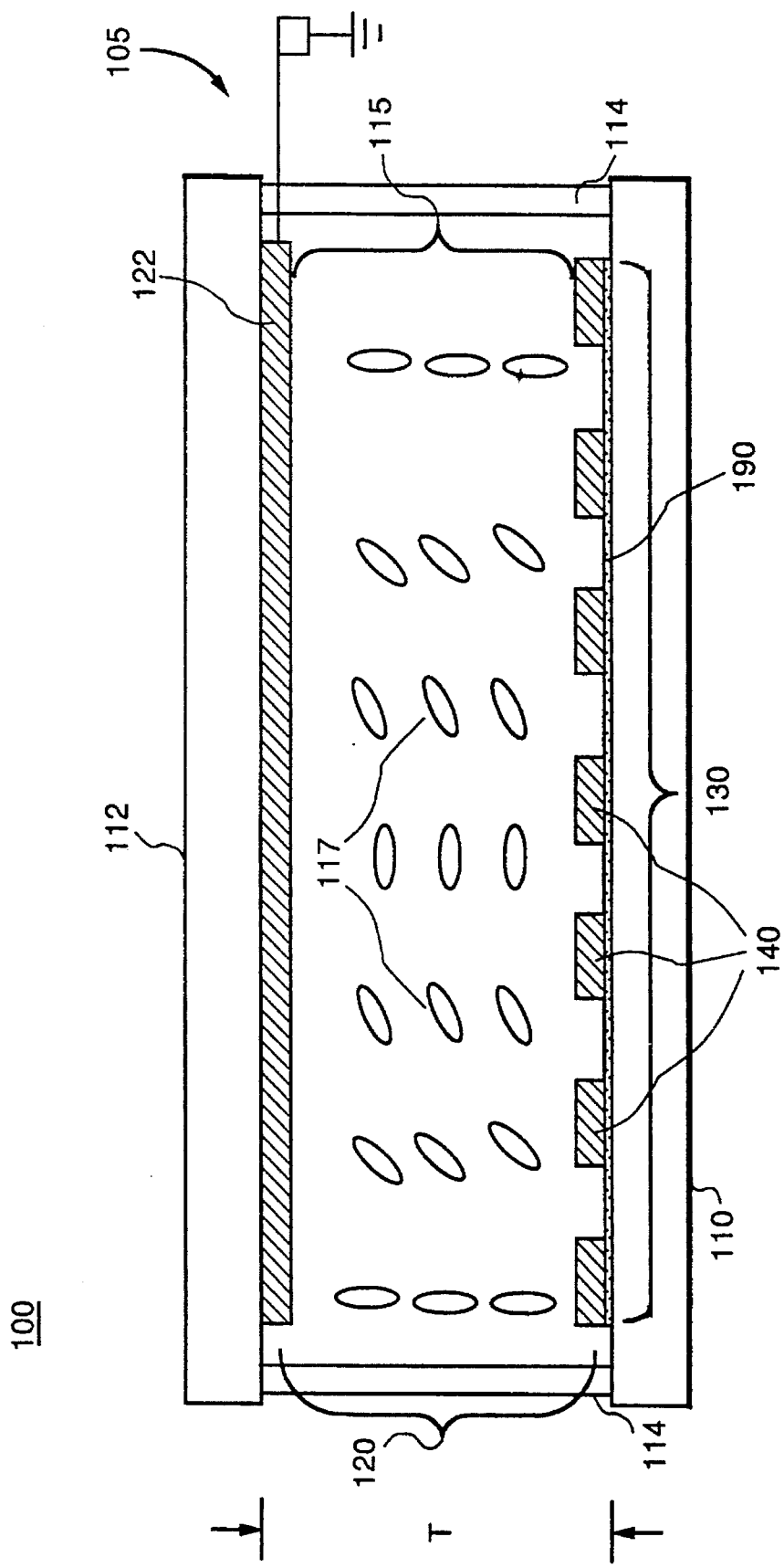
FIG. 1(B) is a cross sectional view of a liquid crystal cell in accordance with the present invention.

A programmable liquid crystal (LC) optical wavefront device 100 (FIG. 1 (A)) in accordance with this invention comprises an LC control apparatus 120 disposed to control the deflection of light rays passing through an LC cell 105 (FIG. 1(B). LC control apparatus typically comprises a bias electrode network 140 and a bias control circuit 150 (FIG. 1(A)); bias control circuit 150 circuit is electrically coupled to bias electrode network 140 so as to selectively apply biasing voltages to respective ones of the electrodes in network 140 to control the orientation of LC molecules in LC cell 105 and hence the deflection of light passing through the cell such that device 100 has a plurality of selectable optical charactersistics (dependent on the voltage applied to the bias electrode network and the consequent effect on orientation of the LC molecules and the light passing through the LC cell). For example, LC device 100 typically acts either as a lens, bending the light rays towards a single point, or as a beam deflector, bending the light rays passing through the device in the same direction.

To provide the programmable selective deflection of light rays, LC control circuit 150 further comprises a beam deflector bias resistor circuit 160, a lens bias resistor circuit 170 and a lens/beam deflector switch circuit 180 that is electrically coupled to both the bias resistor circuits 160 and 170 and bias electrode network 140 to selectively establish a desired bias voltage on each respective electrode in bias electrode network 140.

LC cell 105 (FIG. 1(B)) comprises a first cover 110, and a second cover 112 that is coupled to first cover 110 via sidewalls 114 so as to form a chamber 115 (or envelope) in which liquid crystal (LC) material 117 is disposed. LC cell 105 further comprises LC control apparatus 120 disposed on first cover 110 of cell 105 so as to generate electric fields across chamber 115 to control the orientation of molecules of liquid crystal material 117 (representative molecules having different orientations being illustrated with the oblong shapes in chamber 115).

First and second covers 110, 112 comprise glass such as Corning 7059 or the like. Liquid crystal material 117 typically comprises a nematic liquid crystal having a positive optical anisotropy, that is, having a birefringence ($\Delta n$) that has a value of about 0.2 or more. As used herein, $\Delta n$ or the positive optical anisotropy refers to the difference between the extraordinary index of refraction ($n_e$) of the LC material and the ordinary index of refraction ($n_o$) of the LC material (that is, $\Delta n = n_e - n_o > 0$). The larger the ($\Delta n$)T of an LC cell, the greater will be its capacity to bend light rays. Use of NLC material with a relatively large (e.g., >0.2) $\Delta n$ is desirable because the thickness "T" of LC cell 105 is relatively small (or thin), that is less than about 20 µm, and typically in the range between about 2 µm and 20 µm. It is necessary in designing LC wavefront device 100 to compromise between cell thickness and cell response time (the rapidity with which a liquid crystals in the cell respond to an applied electric signal) as the response time of the cell is proportional to the square of the cell thickness. By way of example and not limitation, nematic liquid crystal (NLC) material such as E63 NLC material available from Merck Company has a $\Delta n$ of 0.227 at 589 nm). Alternatively, cell 105 may comprise other liquid crystal materials that show gray scale control behavior, such as twisted NLC and smectic 'A' liquid crystal.

LC control apparatus 120 typically further comprises a ground electrode 122 that is disposed on the surface of second cover 112 facing chamber 115. Ground electrode 122 comprises a transparent conductive material such as indium tin oxide or the like, and is typically deposited on second cover 112 in evaporative process (a sputter process can also be used) to a thickness of several hundred angstroms. The portion of LC cell 105 containing liquid crystal material 117 comprises an active area 130; light passing through this active area of the cell is influenced by the position of the LC molecules in chamber 115. Ground electrode 122 is disposed across second plate 112 such that it has an area that substantially corresponds to that of an active area 130 of LC device 100. Ground electrode 122 is electrically coupled to a ground terminal 127 that provides a contact point for an external electrical connector to LC device 100.

Figure 2:
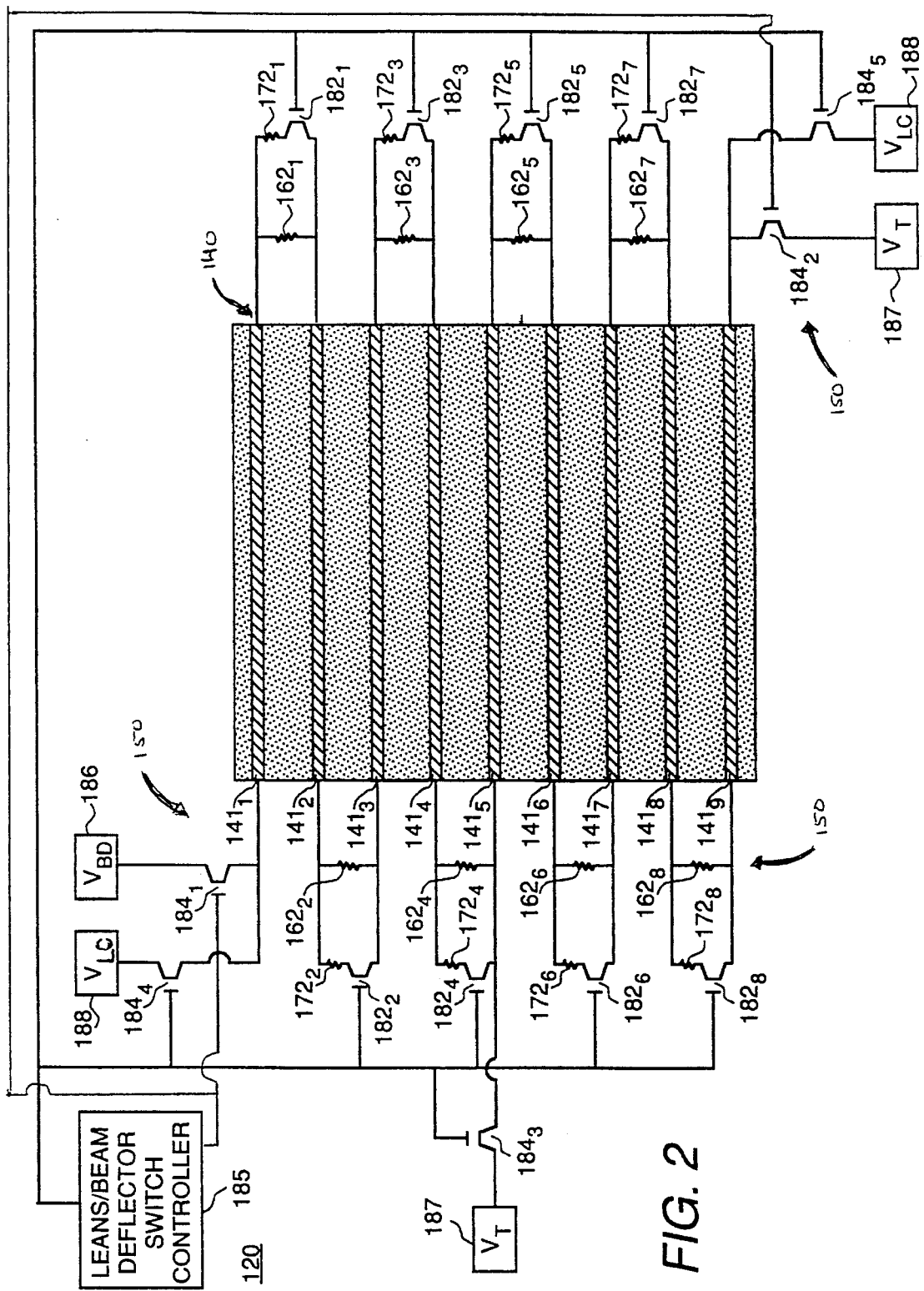
FIG. 2 is a partial plan view and partial block diagram of a portion of a liquid crystal cell in accordance with the present invention.

Bias electrode network 140 comprises a plurality of individual electrodes $141_1$–$141_n$ (for purposes of illustration and not limitation, representative electrodes $141_1$–$141_9$ are illustrated in FIG. 2). The actual number of electrodes in the network is typically a function of how accurately a designer wants to approximate a continuous quadratic function in the lens mode. For example, 98 electrodes disposed on a 1 mm by 1 mm active area has been shown to provides a very good approximation of a cylindrical lens. Additionally, the arrangement of the electrode network is selected to provided the desired lens aperture; voltages applied to the bias electrodes determine the focal depth.

Each electrode 141 comprises an electrically conductive material having a low resistance (e.g., less than 10 ohms per square, and desirably less than 1 ohm per square); for example, molybdenum, titanium, or chrome can be used to form electrodes 141. Alternatively, a transparent conducting material, such as indium tin oxide (ITO), can be used. Such transparent conducting material is typically not as conductive (having a resistance in the range of 100 ohms per square) as metals such as those mentioned above, but provides an advantage in that the electrode body does not block light passing through LC cell 105 (as do the more highly conductive metals mentioned above).

The respective electrodes 141 are disposed over first cover in a parallel pattern (that is, they are aligned along the same axis so as to be substantially parallel to one another); this parallel pattern is readily fabricated and positions the electrodes to generate electric fields across LC cell 105 to effect the operation of device 100 either as a lens or as a beam deflector dependent on the biasing voltages applied to electrode network 140.

Bias electrodes 141 are electrically coupled together in series; that is first-end bias electrode $141_1$ is sequentially coupled to the next bias electrode $141_2$, and so on to the bias electrode at the opposite electrical end of bias electrode network, $141_n$. As used herein, "sequentially coupled" and the like refers to the sequence of two bias electrodes 141 that are coupled to one another. Bias electrode network 140 further comprises a center electrode $141_5$ that is disposed in the physical center of the array. The position of center electrode $141_5$ in LC cell 105 determines the optical axis of LC cell 105, that is, the line along which the focal points of the cell (the focal line) will fall when the device is programmed to operate as a cylindrical lens. Thus the focal line of the cell is corresponds to the axis of the center electrode.

Bias electrodes 141 are coupled together via beam deflector bias resistor circuit 160 and lens bias resistor circuit 170 (FIG. 1A). The particular arrangement of bias resistors to provide lens mode or beam deflector mode operation is determined by lens/beam deflector switch circuit 180. Each bias resistor circuit 160, 170, comprises a plurality of resistor stages, each stage being disposed to couple a respective set of sequentially-coupled bias electrodes together. Typically one of the bias resistor circuits is disposed such that it is always coupled to bias electrode network 140 (that is, regardless of the whether device is operating in a lens mode or in a beam deflector mode, current flowing between sequentially coupled bias resistors passes through the respective stages of that bias resistor network). The addition of the respective resistor stages of the other resistor bias circuit provide the total resistance between sequentially coupled bias electrodes to produce the different mode of device operation. For example, as illustrated in FIG. 2, one bias resistor circuit can be electrically added in parallel by switch circuit 180 to the resistor stages always coupled to the bias electrode network. Alternatively, electrically equivalent arrangements can be used, for example, adding the second bias resistor circuit in series (not illustrated) to the bias resistor circuit always coupled to the bias electrode network; such an arrangement is readily obtained by having the respective switches for each stage short out the resistor of the second bias resistor network during the mode of operation when it is not required to provide the desired biasing voltages for the bias electrodes.

For purposes of illustration and not limitation, bias control circuit 150 as illustrated in FIG. 2 will be described with beam deflector bias resistor circuit 160 disposed such that it is always coupled to bias electrode network 140 and lens bias resistor circuit 170 is disposed such that it is selectively coupled to bias electrode network 140 via lens/beam deflector switch circuit 180.

Beam deflector resistor circuit 160 comprises a plurality of resistor stages $162_1$–$162_n$ (for purposes of illustration in FIG. 2, resistor stages $162_1$–$162_8$). Each beam deflector resistor stage 162 comprises a resistor having a value chosen to generate nominally the same resistance drop $r_{bd}$ (stage resistance for beam deflector mode) between each bias electrode 141. Thus, typically each resistor stage 162 nominally has the same value $r_{bd}$; in the event that there is another significant resistance source (e.g., the material of the electrode or any other component in the circuit), the resistance value of a given stage can be selected in the fabrication process to provide the overall nominal resistance drop $r_{bd}$ across each stage of the circuit. Each biasing resistor stage may comprise one or more resistors electrically coupled together to provide the desired resistance for that stage in the respective network electrode circuit to provide the desired voltage gradient across respective biasing electrodes. By way of example and not limitation, in FIG. 2 single resistors are illustrated for each stage.

Each resistor 162 typically comprises a thin film resistor, that is, a resistor formed as an integral part of the control circuitry comprising the electrode network 140 and switch circuit 180 using thin film fabrication techniques on the same substrate (e.g., cover the LC cell). For example, resistors 162 typically comprise indium tin oxide or the like having a resistance of about 450 ohms/square that is readily deposited and patterned to size the electrode to provide the desired resistance value for a particular stage. As illustrated in FIG. 2, successive resistor stages 162 are sequentially disposed on opposite ends of bias electrodes 141; alternatively, any electrically equivalent arrangement, such as having all resistor stages can be disposed on the same end of bias electrode network 140, is acceptable.

Lens bias resistor circuit 170 is disposed in LC control apparatus 120 such that it is selectively electrically coupled to bias electrode network 140 via switching components of lens/beam deflector switching circuit 180. Lens bias resistor circuit 170 comprises a plurality of resistor stages $172_1$–$172_n$ (representative stages $172_1$–$172_8$ being illustrated in FIG. 2). The resistance values of particular stages 172 have values that produce, when coupled in parallel with corresponding stages 162 of beam deflector bias resistor circuit 160, a symmetrical quadratic bias resistor values across bias electrode network 140. As used herein "symmetrical quadratic" or the like refers to stages of resistance values that produce an electric field that varies in accordance with a quadratic relationship from either side of center electrode $141_5$ (e.g., laterally along the plane of first cover 110); as the field is symmetrical, the magnitude of the electric field at the same distance on either side of center electrode $141_5$ is the same (e.g., as illustrated in FIG. 2, electrodes $141_4$ and $141_6$ are both at one potential, electrodes $141_3$ and $141_7$ are both at a second potential, and so forth).

The respective resistance values of each stage of lens bias resistor circuit 170 are thus selected to provide the desired voltage drop across each stage to provide a symmetric quadratic voltage profile extending from center electrode $141_5$ respectively towards first end bias electrode $141_1$ and second bias electrode $141_9$. By way of example and not limitation, in the arrangement illustrated in FIG. 2, respective lens bias resistor stages 172 have values such that when coupled in parallel combination with the corresponding beam deflector resistor stage 162 (e.g., $1/r_{comb}=1/r_{bd}+1/r_{Lens}$) the $r_{comb}$ for respective stages m extending away from center bias electrode $141_5$ corresponds to the series relationship expressed by:

$$r_m = (2m-1)r_1,$$

wherein $r_m$ is the total resistance across stage m and r is the total resistance across the first stage. Mathematically, the quadratic relation is established by summing all of the ir drops across each stage. The total voltage at the nth electrode is expressed by the relation:

$$\begin{aligned} v_n &= ir_1 + ir_2 + ir_3 + \ldots ir_m + \ldots ir_n \\ &= \sum_{m=1}^{n} r_m \end{aligned}$$

Substituting the formula for $r_m$ provides the following relation:

$$v_n = i \sum_{m=1}^{n} (2m-1)r.$$

Note that for n=1, 2, 3, 4 . . . , the value of $v_n$ is ir, 4ir, 9ir, 16ir . . . .

The total resistance across each stage (including the biasing electrode and any other components) is thus used to size the respective biasing resistor for a given stage. Assuming highly conductive bias electrodes 141 (that is, electrodes having internal resistances small enough to be ignored in designing the resistor bias circuit stages to provide desired electric fields), the combined first stage biasing resistance $r_{comb}$ has a nominal resistance value of r ohms; the next stage of biasing resistor (that is, with lens bias resistor circuit coupled to bias electrode network 140) has a nominal resistance value of 3r ohms; third and subsequent stage biasing resistors have nominal values of 5r, 7r, 9r and so forth continuing on in the same series. These nominal resistance values, added to the resistance of the preceding biasing resistors (that is, resistors between the subject biasing resistor and center electrode $141_5$) generate the desired quadratic voltage profile across bias electrode network 140. Because the bias electrodes are electrically coupled together in series, the current i through each stage of the network is the same. Thus the voltage drop across the first stage is iR, across the second stage i(r+3r)=4ir; across the third stage i(4r+5r)=9ir, and so forth. In the typical arrangement, the distance between each respective biasing electrode 141 is uniform so that the voltage on respective sequentially-coupled electrodes varies as the square of the distance from center electrode $141_5$ (that is, the optical axis of LC cell 105).

The lens and beam deflector modes of operation of the LC cell are representative examples of bias resistor networks. Alternatively, bias resistor networks can be designed to provide any desired voltage profile across bias electrodes 140, e.g., a squared or cubed voltage gradient, by use of appropriate resistance values in the resistor stages between sequentially coupled bias electrodes. Further, a customized profile to account for optical aberrations in the LC cell in order to provide a desired output from the cell.

Lens/beam deflector switch circuit comprises a plurality of thin film resistor network switching components 182 that selectively couple lens bias resistor circuit 170 to bias electrode network 140 and thin film control voltage switching components 184 so as to switch LC control apparatus 120 operation between a lens mode and a beam deflector mode. Typically switching components 182 and 184 each comprise thin film transistors that are selectively controlled to be in either a conductive or non-conductive state by the application of a voltage to the gate of the transistor.

Switching circuit 180 comprises resistor network switching components $182_1$–$182_n$ (representative switches $182_1$–$182_8$ being illustrated in FIG. 2) that are coupled to a switch controller 185 that supplies the signals to change switch components 182 between conductive and non-conductive states. By way of example and not limitation, in the arrangement illustrated in FIG. 2, each resistor network switch component 182 is disposed such that, when it is in the conductive state (e.g., in the lens mode), it couples a lens bias resistor stage in parallel with the corresponding beam deflector bias resistor stage; conversely, in the beam deflector mode of switch circuit 180, the resistor network switch component is non-conductive and thus the lens bias resistor stage resistor is electrically isolated from bias electrode circuit 140 and all current flowing between sequentially-coupled bias electrodes is via only the respective beam deflector bias resistor stage. Alternatively, as noted above, respective bias resistors 162 and 172 for each stage can be coupled in series (not shown) with respective stage switch component 182 being disposed to short out one of the bias resistors in the mode of operation when it is not required to generate the desired voltage gradient.

Lens/beam deflector switch circuit controller 185 further controls thin film control voltage switching components 184 to coupled biasing voltage sources to selected bias electrodes 141. For example, in the beam deflector mode of operation, a beam deflector control voltage ($V_{BD}$) source 186 is coupled via a first control voltage switching component 184$_1$ to first end bias electrode 141$_1$ and a threshold voltage source (VT) 187 is coupled to second end bias electrode 141$_9$ via a second control voltage switching component 184$_2$; switching components 184$_1$ and 184$_2$ are coupled to controller 185 so that they are both conductive when the device is in the beam deflector mode of operation. Threshold voltage source 187 has a potential near the LC threshold value (that is, the minimum potential that results in deflection of the LC molecules from their non-biased orientation); for example, a typical center bias voltage potential is about 1 Volt (e.g., the peak voltage for a 1 KHz square wave) for the NLC material discussed above. The difference between $V_T$ and $V_{BD}$ determines the voltage drop across bias electrode array 140 from first end electrode 141$_1$ to second end electrode 141$_9$ (the voltage drop occurring in equal increment across each set of sequentially-coupled bias electrodes) and thus the degree to which light rays passing through device 100 are bent or deflected.

In the lens mode, control voltage switching components 184$_1$ and 184$_2$ are non-conductive such that beam deflector control voltage source 186 is electrically isolated from first end bias electrode 141$_1$ and threshold voltage source 187 is electrically isolated from second end bias electrode 141$_9$. Controller 185 generates a signal to cause control voltage switching component 184$_3$ to become conductive and couples threshold voltage source 187 to center electrode 141$_5$; further, controller 185 generates signals to cause control voltage switching component 184$_4$ and 184$_5$ to become conductive so as to connect a lens control voltage source ($V_{LC}$) 188 to first end electrode 141$_1$ and second end electrode 141$_9$ respectively. In the lens mode, bias electrode network 140 is center-biased, that is, center electrode 141$_1$ is maintained at the threshold electrode value $V_T$ and the symmetrical quadratic voltage pattern is determined by the magnitude of lens control voltage $V_{LC}$, with changes in the $V_{LC}$ determining the position of the focal line with respect to LC cell 105 (the symmetric electric fields on either side of bias electrode 141$_5$ are essentially mirror images of the other).

In an alternative arrangement (not illustrated), a single switchable voltage source can be used to generate the lens control and the beam deflector control voltages (as opposed to selectively coupling two separate voltage sources to the bias electrodes).

Typically, LC device 100 further comprises a resistive planar layer 190 (FIG. 1(B)) disposed on first cover 110 in electrical contact with bias electrode network 140. Resistive planar layer 190 is typically disposed on first cover 110 with quadratic electrode network disposed thereover. Resistive planar layer 190 comprises a high resistivity material (e.g., having a resistance per square that is at least one or more orders of magnitude greater than that of the respective stage biasing resistors in lens bias resistor network 170 and beam deflector bias resistor network 160). For example, planar resistive layer comprises amorphous silicon, such as n+ type silicon, having a resistance of about 16 MΩ per square; alternatively n– type amorphous silicon can be used. Because the resistance of planar layer 190 that is between sequentially-coupled biasing electrodes 141 is greater than the resistance of the respective bias resistor stage through which the biasing electrodes are coupled such that substantially all current flow is through the biasing electrodes and associated stages of biasing resistors. The presence of resistive planar layer 190 between respective electrodes in bias electrode network 140 results in a substantially linear voltage gradient across the respective gap between adjacent electrodes 141 in active area 130 of LC cell 105 (FIG. 1B). This arrangement provides a smoother approximation of the desired continuous quadratic index perturbation required for lens effect, thus improving lens efficiency by reducing the diffracted light that is lost when the biasing voltages are applied across LC cell 105 only in discrete steps (e.g., the biasing voltages are applied to approximate the quadratic voltage gradient only at the points along the respective biasing electrodes.

In one example of an LC programmable wavefront device 100 fabricated in accordance with this invention, the width of the biasing electrodes is about 2.5 μm and the biasing electrodes are disposed on resistive planar layer 190 on about 12 μm centers, such that there is a gap of about 9.5 μm between respective sequential biasing electrodes. These biasing electrodes are readily used in an LC cell having an active area with a width of 1 mm or more, that is, the respective biasing electrodes have a length of about 1 mm. Biasing electrodes fabricated from molybdenum have a resistance in the range of about 0.25 Ω/sq to 0.4 Ω/sq, which is significantly less than the resistance of resistive planar layer 180. The same conductive material that is used to form biasing electrodes is typically further used to provide connecting lines to the respective stage biasing resistors. The biasing resistor stages are typically fabricated with ITO having a resistance of 450 Ω/sq. One arrangement of biasing resistors, with the biasing resistors disposed outside of active area 130, is illustrated in FIG. 2. As noted above, each stage of biasing resistor may comprise one resistor or multiple resistors electrically coupled together (either in series or parallel) (splitting resistors for a given stage can provide space-saving advantages on the substrate or cover plate on which the network is formed). Alternative arrangements (not illustrated) include disposing the respective stages of biasing resistors on active area 130 (e.g., using a non-opaque material such as indium tin oxide), with the respective stages of resistors coupling adjacent biasing electrodes, thus making available more space on the substrate or cover plate for the active area of the device. Due to the thin film nature of the resistive planar layer, the bias electrode network, and the LC control apparatus, the assembled cell is thin, with the thickness typically being less than the center to center spacing of the electrodes (in order to provide good resolution). LC cells in accordance with this invention commonly have a thickness in the range of about 0.2 μm to about 20 μm, with a typical thickness being about 9 μm.

A single LC wavefront device 100 as described herein can be selectively controlled to act as either a beam deflector or as a cylindrical lens. In the lens mode, the device can be controlled to focus light passing through the cell onto a focal line, that is, the focal points generated across the lens form a line parallel to the axis of the electrodes of the LC cell. For a spherical electro-optic lens (that is, the lens will focus light to a single point), two such LC wavefront devices are typically optically coupled together in a cascade (that is, light passing from one LC device is directed into the second LC device) with the respective optical axis of the LC devices being disposed orthogonal to one another. Similarly, an elliptical electro-optic lens can be provided by applying different control voltages to the respective lens focus control terminals of the respective cells, such that the focal lines of the two lenses in the cascade are not disposed the same distance from the lens.

In a further alternative embodiment in accordance with this invention (not illustrated), a programmable optical wavefront device may comprise a first LC control apparatus disposed on first cover 110 and a second, independent, LC control apparatus disposed on second cover 112, that is, on opposing sides of LC cell 105. The respective electrode axis of each LC control apparatus is disposed orthogonal to the other (just as the respective electrode axis of each cell in a cascade of cells is disposed orthogonal to the electrode axis of the other cell in the cascade). In this embodiment, each respective LC control apparatus is the same as described above; in this embodiment, however, there is no dedicated ground electrode 127, but rather the threshold-potential biased center electrode on the opposing face of the cell serves as the threshold potential for the liquid crystals. In this arrangement, a single LC cell comprises the components to be a spherical (or elliptical) lens, and, in the beam deflector mode, to deflect light rays along the two orthogonal electrode axes of the respective LC control apparatus in the LC cell.

Further, in accordance with this invention, LC control apparatus is typically comprises thin film components (e.g., bias resistor networks 140 and bias control circuit 150) that are readily fabricated on a single substrate, such as one plate of LC cell 105, providing for compact and rugged construction of the device.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A programmable liquid crystal optical wavefront device adapted to exhibit a plurality of selectable optical characteristics, said device comprising:

a liquid crystal control apparatus disposed in a liquid crystal (LC) cell so as to control the orientation of LC material disposed in said LC cell to selectively deflect light beams passing through said LC cell, said LC control apparatus comprising a bias electrode network and a bias control circuit electrically coupled to said bias electrode network;

said bias control circuit comprising a first bias resistor circuit, a second bias resistor circuit, and a switch circuit for selectively coupling said first and second bias resistor circuit to one another; each of said resistor circuits comprising a plurality of respective bias resistor stages selectively coupled to said bias electrode network.

2. The LC device of claim 1 wherein said first bias resistor circuit comprises a lens bias resistor circuit, said second bias resistor circuit comprises a beam deflector bias resistor circuit, and said switch circuit comprises a lens/beam deflector switch circuit, said lens bias resistor stages further being electrically coupled to said beam deflector resistor stages via said lens/beam deflector switch circuit.

3. The LC device of claim 2 wherein said bias control circuit is adapted to provide a lens mode bias resistor arrangement and a beam deflector mode bias resistor arrangement, the respective bias resistor arrangement being determined by said lens/beam deflector switch circuit such that in said beam deflector mode said respect bias resistor circuits are coupled to said bias electrode network to provide a uniform voltage drop between each adjoining electrode in bias electrode network and in said lens mode to provide a center-biased symmetric quadratic voltage drop across said bias electrode network.

4. The LC device of claim 3 wherein said lens/beam deflector switch circuit comprises a plurality of thin film switches disposed to selectively couple respective stages of said lens bias resistor circuit to corresponding respective stage of said beam deflector bias resistor circuit so as to provide a respective selected resistance electrically disposed between adjacent ones of said bias electrodes.

5. The LC device of claim 4 wherein each of said thin film switches comprise a thin film transistor.

6. The LC device of claim 4 wherein said bias electrode network comprises a plurality of electrodes disposed in said LC cell in a parallel pattern, said bias electrodes being sequentially electrically coupled together in series via respective portions of said bias control circuit, said parallel pattern of said bias electrode further comprising a bias network first end electrode, a bias network second end electrode, and a bias network center electrode, said center bias electrode being disposed in the center of said bias electrode network.

7. The LC device of claim 6 wherein said lens/beam deflector switch circuit further comprises a threshold bias switch disposed to selectively couple a threshold voltage source to said bias network center electrode in said lens mode bias resistor arrangement, and to a selected one of the bias network end electrodes in said beam deflector mode bias resistor arrangement.

8. The LC device of claim 7 wherein said LC control apparatus further comprises a control voltage source switchably coupled via said lens/beam deflector switch circuit to said bias network first end electrode and said bias network second end electrode.

9. The LC device of claim 3 wherein said LC cell comprises a first plate and a second plate, said first and second plates being disposed substantially parallel to one another with said LC material disposed therebetween, said LC control apparatus being disposed on said first plate.

10. The LC device of claim 9 further comprising a ground electrode disposed on said second plate.

11. The LC device of claim 9 comprising a first and a second LC control apparatus, said first LC control apparatus disposed on said first plate and said second LC control apparatus disposed on said second plate, the respective focal lines of said first and second LC control apparatus being disposed orthogonal to one another.

12. The LC device of claim 10 comprising two LC cells optically coupled together in a cascade, the respective focal lines of said two LC cells being disposed orthogonal to the other.

13. The LC device of claim 3 wherein said LC control apparatus further comprises resistive planar layer disposed in electrical contact with said bias electrode network, said resistive planar layer having a substantially uniform resistivity such that a substantially linear voltage gradient exists across gaps between respective electrodes in said bias electrode network.

14. The LC device of claim 1 wherein said LC control apparatus comprises a thin film control apparatus disposed on a single substrate.

15. A programmable liquid crystal control apparatus for use in a liquid crystal cell to control the orientation of LC material disposed in said LC cell to selectively direct light beams passing through said LC cell, said control apparatus comprising:

a bias electrode network comprising a plurality of electrodes electrically coupled together in series, said bias electrodes being disposed in a parallel pattern over a cover plate of said LC cell; and a bias control circuit electrically coupled to said bias electrode network;

said bias control circuit further comprising a lens bias resistor circuit, a beam deflector bias resistor circuit, and a lens/beam deflector switch circuit; each of said resistor circuits comprising a plurality of respective bias resistor stages selectively coupled to said bias electrode network, said lens bias resistor stages further being electrically coupled to said beam deflector resistor stages via said lens/beam deflector switch circuit; respective stages of said lens bias resistor circuit and said beam deflector bias resistor circuit being coupled between respective ones of said bias electrodes so as to electrically coupled said bias electrodes in series.

16. The LC control apparatus of claim 15 wherein said bias electrode network comprises a center electrode, a first end electrode disposed at one electrical end of the plurality of series-coupled bias electrode network, and a second end electrode disposed at the opposite electrical end of the series-coupled bias electrode network.

17. The LC control apparatus of claim 16 wherein said beam deflector bias resistance circuit comprises a plurality of resistor stages, each of said stages having a resistance value selected to provide, when said beam deflector bias resistance circuit is coupled to said lens bias circuit, a substantially uniform voltage drop between each sequentially coupled bias electrode in said bias electrode network.

18. The LC control apparatus of claim 17 wherein each of the beam deflector bias resistance circuit resistor stages comprises a resistor having the same nominal resistance value.

19. The LC control apparatus of claim 17 wherein said lens bias resistor circuit comprises a center-biased symmetrical quadratic biasing resistor network comprising a first and a second lens bias subassembly of quadratic gradient network biasing resistors, said first subassembly being coupleable to said bias electrode network between said center electrode and said first end electrode and said second subassembly being coupleable to said bias electrode network between said center electrode and said second end electrode;

said first and second lens bias subassemblies each comprising a plurality of resistor stages, the respective resistance values of each resistor stage in said first and second subassembly being selected to provide, when coupled to said bias electrode network, a quadratic voltage gradient between sequentially-coupled ones of said bias electrodes away from said center electrode.

20. The LC control apparatus of claim 19 wherein each of said first and second subassembly comprise first through nth stage resistors, said first stage resistor being electrically coupled to said center electrode; said respective stage resistors having a resistance value such that when coupled in parallel with the corresponding beam deflector bias resistor stage, the resistance between the first and second stages of said subassembly corresponds to a combined resistance of r, the second through nth resistors in said respective subassembly having respective resistance values corresponding to the relationship:

$$r_m = (2m-1)r_1,$$

wherein $r_m$ is the total resistance across stage m and r is the total resistance across the first stage.

21. The LC control apparatus of claim 18 wherein said lens/beam deflector switch circuit comprises a plurality of thin film switches disposed to selectively electrically couple said lens bias resistor circuit and said beam deflector bias resistor circuit to said bias electrode network, the respective switches of said lens/beam deflector switch circuit having respective beam deflector mode and lens mode positions.

22. The LC control apparatus of claim 18 wherein said beam deflector bias resistor circuit is always coupled to said bias electrode network and, in said lens mode, said lens bias resistor circuit is coupled in parallel to said beam deflector bias resistor circuit via respective switches of said lens/beam deflector circuit.

23. The LC control apparatus of claim 18 wherein said lens bias resistor circuit is always coupled to said bias electrode network and, in said beam deflector mode, said beam deflector bias resistor circuit is coupled in parallel to said lens bias resistor circuit via respective switches of said lens/beam deflector circuit.

24. The LC control apparatus of claim 18 wherein said lens/beam deflector switch circuit further comprises control voltage switches coupled to said bias electrode network to apply a control voltage and a threshold voltage to respective ones of said bias electrodes in correspondence with a mode selection of said lens/beam deflector switch circuit.

25. The LC control apparatus of claim 24 wherein respective ones of said control voltage switches are disposed to selectively couple a threshold bias voltage source between said center electrode and to said second end electrode.

26. The LC control apparatus of claim 25 wherein respective ones of said control voltage switches are disposed to selectively couple an optical wavefront control voltage to said first end electrode in the beam deflector mode and to both said first end and second end electrodes in the lens mode.

27. The LC control apparatus of claim 15 further comprising an optically transmissive electrically resistive planar layer disposed in electrical contact with said bias electrode network, said resistive planar layer having a substantially uniform resistivity such that a substantially linear voltage gradient exists across gaps between respective sequentially-coupled electrodes in said bias electrode network.

* * * * *